United States Patent
Nielsen et al.

(10) Patent No.: US 9,722,416 B2
(45) Date of Patent: Aug. 1, 2017

(54) ISOLATING FAULTY CONVERTER MODULE IN CONVERTER SYSTEM WITH INTERCONNECTED DC LINKS

(75) Inventors: John Godsk Nielsen, Hornslet (DK); Ove Styhm, Hadsten (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 422 days.

(21) Appl. No.: 14/232,203

(22) PCT Filed: Jul. 11, 2012

(86) PCT No.: PCT/DK2012/050266
§ 371 (c)(1),
(2), (4) Date: Feb. 26, 2014

(87) PCT Pub. No.: WO2013/007268
PCT Pub. Date: Jan. 17, 2013

(65) Prior Publication Data
US 2014/0192570 A1    Jul. 10, 2014

Related U.S. Application Data

(60) Provisional application No. 61/507,625, filed on Jul. 14, 2011.

(30) Foreign Application Priority Data

Jul. 14, 2011 (DK) .................................. 2011 70383

(51) Int. Cl.
*H02M 3/158* (2006.01)
*H02H 7/12* (2006.01)
(Continued)

(52) U.S. Cl.
CPC ........... *H02H 7/1216* (2013.01); *F03D 9/255* (2017.02); *H02J 1/102* (2013.01); *H02J 3/386* (2013.01);
(Continued)

(58) Field of Classification Search
USPC ........... 363/34–37, 50, 53, 56.03, 56.04, 65, 363/67–72
See application file for complete search history.

(56) References Cited

U.S. PATENT DOCUMENTS

| | | |
|---|---|---|
| 5,907,192 A | 5/1999 | Lyons et al. |
| 2006/0203528 A1* | 9/2006 | Miyazaki ................ H02M 1/32 363/131 |

(Continued)

FOREIGN PATENT DOCUMENTS

| | | |
|---|---|---|
| CN | 101710789 A | 5/2010 |
| EP | 1128064 A2 | 8/2001 |

(Continued)

OTHER PUBLICATIONS

International Search Report for PCT/DK2012/050266, Mar. 7, 2014.

(Continued)

*Primary Examiner* — Jeffrey Gblende
(74) *Attorney, Agent, or Firm* — Patterson + Sheridan, LLP

(57) ABSTRACT

According to an embodiment, a power generation system is provided comprising a power generator; a plurality of converter modules, each converter module having a DC link, wherein the DC link of each converter module is connected to the DC links of the other converter modules of the plurality of converter modules via a fuse associated with the converter module; and a controller configured to, if it is detected that there is a fault in one of the converter modules, disconnect the converter module in which there is a fault from the power generator and connect two or more other converters module of the plurality of converter modules to the power generator and to control the power generation system to supply power to the DC links of the two or more other converter modules such that power is supplied to the (Continued)

converter module in which there is a fault via the fuse associated with the converter module such that the fuse associated with the converter module melts.

20 Claims, 5 Drawing Sheets

(51) Int. Cl.
*H02J 1/10* (2006.01)
*H02J 3/38* (2006.01)
*F03D 9/25* (2016.01)
*H02M 1/32* (2007.01)
*H02M 1/36* (2007.01)

(52) U.S. Cl.
CPC ............ *H02M 1/36* (2013.01); *H02M 3/1582* (2013.01); *H02M 2001/325* (2013.01); *Y02E 10/72* (2013.01); *Y02E 10/763* (2013.01)

(56) References Cited

U.S. PATENT DOCUMENTS

| | | | | |
|---|---|---|---|---|
| 2007/0057516 | A1* | 3/2007 | Mever | F03D 7/0224 290/44 |
| 2007/0108769 | A1 | 5/2007 | Wobben | |
| 2008/0130182 | A1* | 6/2008 | Anderson | H02M 7/493 361/78 |
| 2010/0188055 | A1* | 7/2010 | Patterson | H02P 9/02 322/90 |
| 2011/0025059 | A1* | 2/2011 | Helle | F03D 9/02 290/44 |
| 2011/0106325 | A1* | 5/2011 | Opina, Jr. | H02J 3/386 700/287 |
| 2011/0298283 | A1* | 12/2011 | Sannino | B63J 3/04 307/38 |
| 2012/0026631 | A1* | 2/2012 | Kazemi | H02H 3/16 361/42 |

FOREIGN PATENT DOCUMENTS

| | | |
|---|---|---|
| EP | 1475882 A2 | 11/2004 |
| EP | 1909371 A2 | 4/2008 |
| WO | 2007/003183 A1 | 1/2007 |
| WO | 2010058028 A2 | 5/2010 |
| WO | 2010112616 A1 | 10/2010 |

OTHER PUBLICATIONS

Wijenayake A H et al: "Modeling and analysis of shared/comnon DC bus operation of AC drives. I'", Industry Applications Conference, 1997. Thirty-Second IAS Annual Meeting, IAS '97. , Conference Record of the 1997 IEEE New Orleans, LA, USA Oct. 5-9, 1997, New York, NY, USA, IEEE, US, vol. 1, Oct. 5, 1997 (Oct. 5, 1997), pp. 599-604.

* cited by examiner

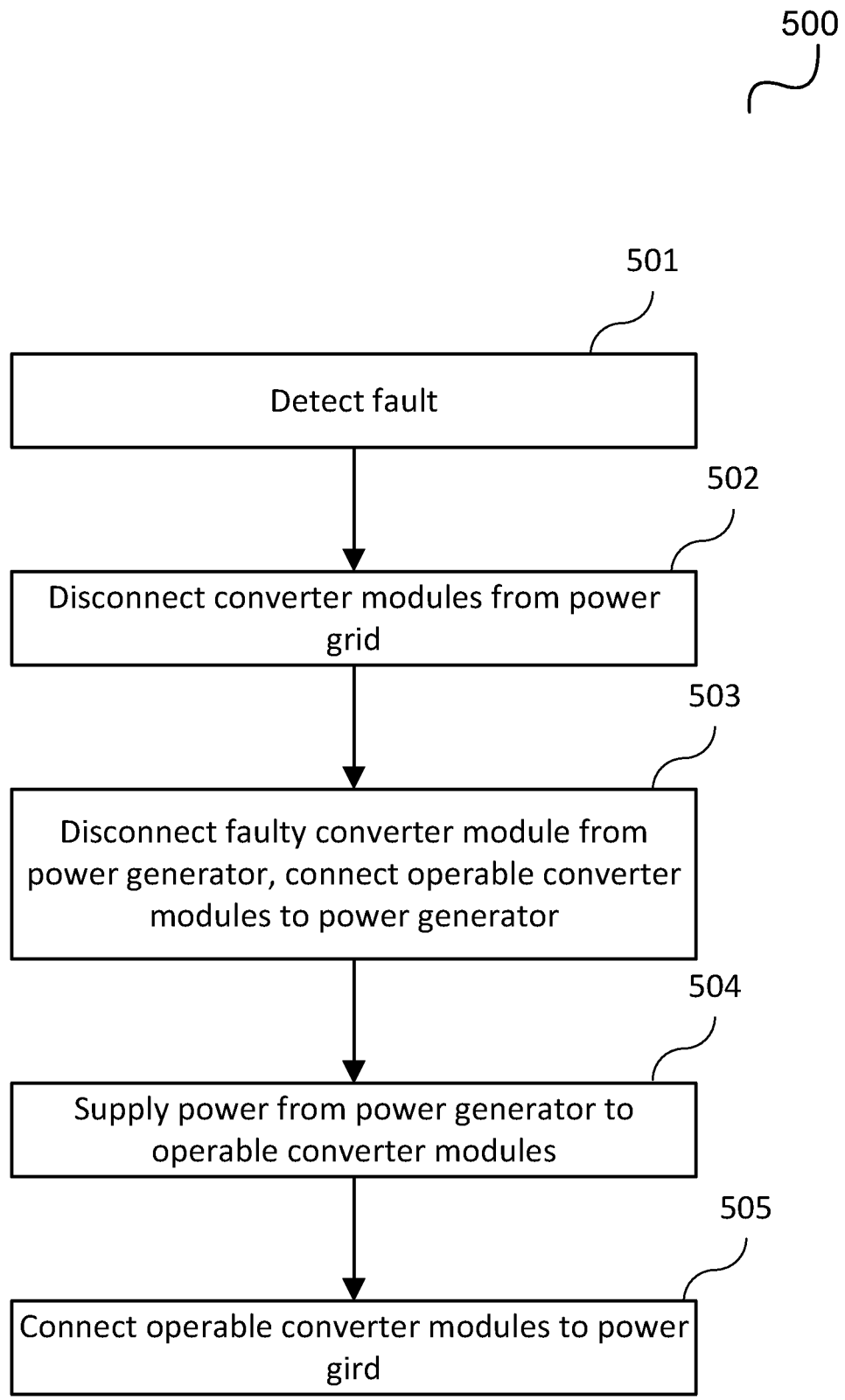

ISOLATING FAULTY CONVERTER MODULE IN CONVERTER SYSTEM WITH INTERCONNECTED DC LINKS

BACKGROUND

The present invention relates to a power generation system and a method for operating a power generation system.

AC power generators may be connected to a power grid via a converter system which comprises a plurality converter modules, wherein each converter module comprises a DC link. Since a fault in one of the converter module may affect the functionality of the whole system, efficient ways to isolate faulty converter modules are desirable. Isolating faulty converter modules not only includes disconnecting the converter modules from the generator and the power grid, but also include disconnecting the DC link of the faulty converter module from the other DC links of the other converter modules.

SUMMARY OF THE INVENTION

According to an embodiment, a power generation system is provided comprising a power generator; a plurality of converter modules, each converter module having a DC link, wherein the DC link of each converter module is connected to the DC links of the other converter modules of the plurality of converter modules via a fuse associated with the converter module; and a controller configured to, if it is detected that there is a fault in one of the converter modules, disconnect the converter module in which there is a fault from the power generator and connect two or more other converter module of the plurality of converter modules to the power generator and to control the power generation system to supply power to the DC links of the two or more other converter modules such that power is supplied to the converter module in which there is a fault via the fuse associated with the converter module such that the fuse associated with the converter module melts.

The fuse associated with the converter module may be part of the converter module.

The power generator is for example a permanent magnet generator.

According to one embodiment, the two or more other converter modules are converter modules for which no fault has been detected.

The power generation system may further comprise a detector configured to detect whether there is a fault in one of the converter modules of the plurality of converter modules.

According to one embodiment, each converter module has an input to receive power from the power generator and an output to provide power to a power grid, wherein the input is connected to the output via the DC link.

The power generation system may further comprise an AC/DC converter and a DC/AC converter wherein the AC/DC converter forms the input and the DC/AC converter forms the output.

The fault is for example a short circuit of the DC link.

According to one embodiment, the converter modules are configured to supply power to a power grid and the controller is further configured to disconnect the plurality of converter modules from the power grid before controlling the power generation system to supply power to the DC links of the two or other more converter modules such that power is supplied to the converter module in which there is a fault via the fuse associated with the converter module such that the fuse associated with the converter module melts.

According to one embodiment, the controller is further configured to connect the two or more other converter modules to connect to a power grid to supply power to the power grid after the fuse has been melted.

According to one embodiment, the controller is configured to control the power generation system to supply power to the DC links of the two or more other converter modules such that power is supplied to the converter module in which there is a fault via the fuse associated with the converter module such that the fuse associated with the converter module melts in course of a pre-charge procedure for pre-charging the converter modules.

According to one embodiment, the controller controls the power generation system to supply power to the DC links of the two or more other converter modules such that power is supplied to the converter module in which there is a fault via the fuse associated with the converter module such that the fuse associated with the converter module melts by connecting the two or more other converter module to the power generator.

According to one embodiment, a method for operating a power generation system according to the power generation system described above is provided. It should be noted that embodiments described in context with the power generation system are analogously valid for the method for operating a power generation system and vice versa.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 5 shows a flow diagram according to an embodiment.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
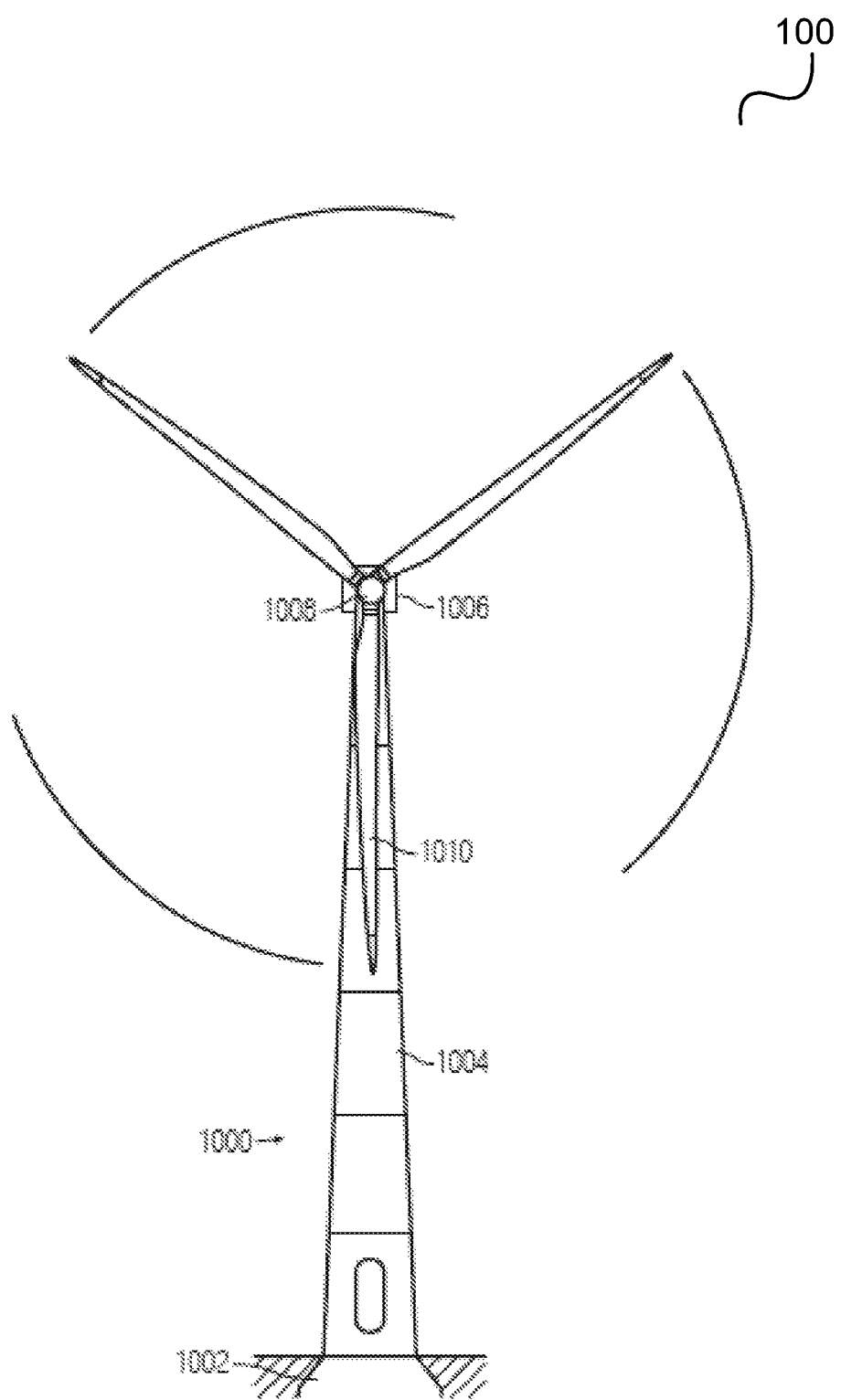
FIG. 1 illustrates a common setup of a wind turbine.

FIG. 1 illustrates a common setup of a wind turbine 100 in which embodiments may be used. The wind turbine 100 is mounted on a base 1002. The wind turbine 100 includes a tower 1004 having a number of tower sections. A wind turbine nacelle 1006 is placed on top of the tower 1004. The wind turbine rotor includes a hub 1008 and at least one rotor blade 1010, e.g. three rotor blades 1010. The rotor blades 1010 are connected to the hub 1008 which in turn is connected to the nacelle 1006 through a low speed shaft which extends out of the front of the nacelle 1006.

Figure 2:
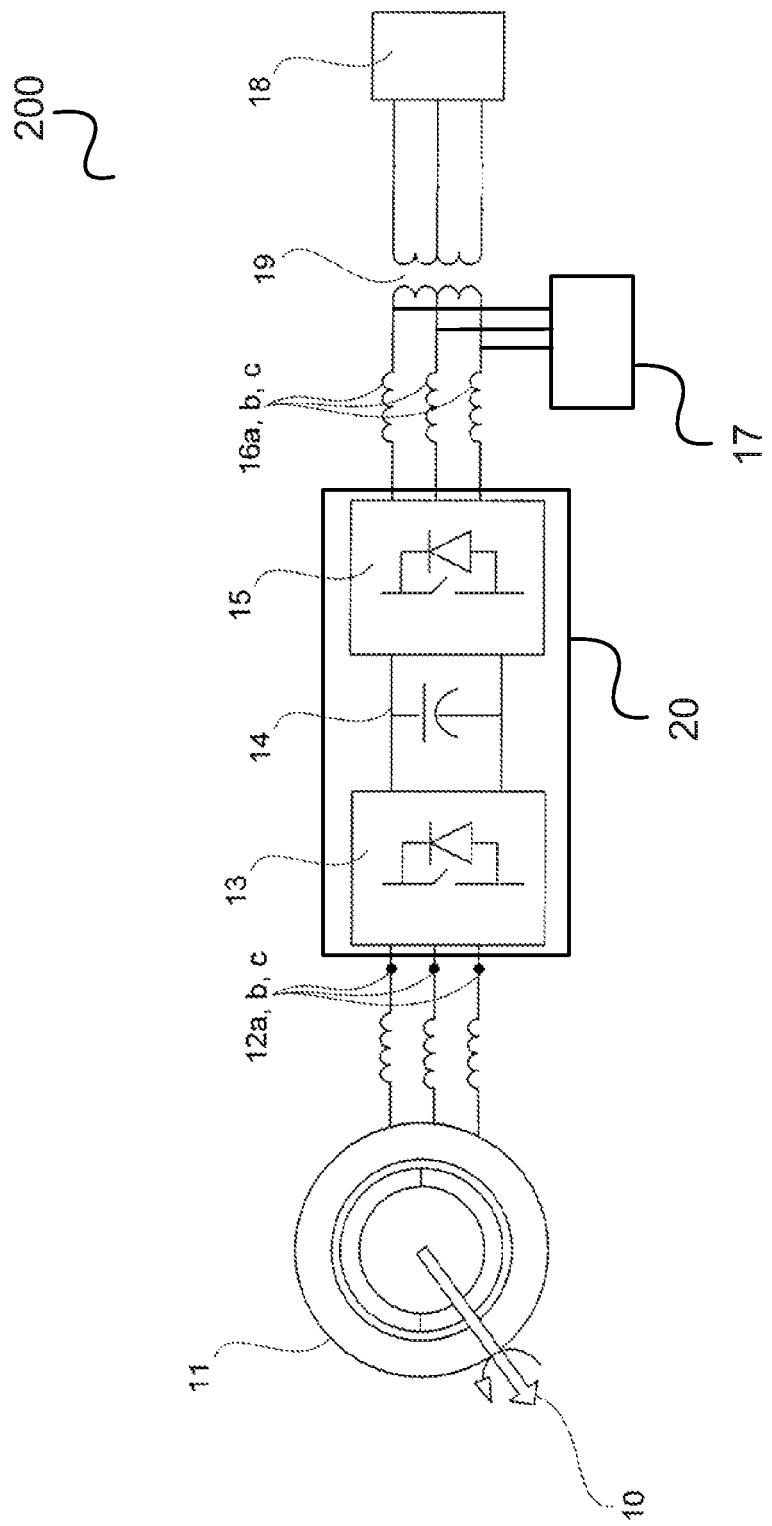
FIG. 2 illustrates an example of power generation system according to an embodiment.

FIG. 2 illustrates an example of power generation system 200 according to an embodiment.

A shaft 10 transfers mechanical energy from an energy source, for example the at least one rotor blade 1010 shown in FIG. 1, to a rotor of a variable speed generator 11. The shaft 10 is connected to the at least one rotor blade 11 and is for example connected to the rotor via a gearbox in order to adapt the rotational speed of the shaft 10 (i.e. the speed of the wind turbine blades) to a speed range suitable for the generator 11. The generator 11 converts the mechanical energy provided via the shaft 10 into electrical energy and delivers the electrical energy at a set of stator terminals 12a, 12b, 12c. The generator 11 is in this example a permanent magnet (PM) generator. The rotational speed of the shaft 10 varies as a function of the wind speed. Since the rotational speed of the rotor of the generator 11 is proportional to the rotational speed of the shaft 10, the amplitude and frequency of the voltage signal provided by the generator 11 at the stator terminals 12a, 12b, 12c varies in accordance with the rotational speed of the shaft 10. The terminals 12a, 12b, 12c of the generator 11 are connected to a generator side power converter 13. The converter 13 for example comprises a set of switches in the form of, for example, MOSFETs, GTOs, IGBTs or BJTs.

The converter 13 functions, under normal operation, as an active rectifier converting the variable frequency AC voltage provided by the generator 11 into a DC voltage. The conversion may be controlled using a pulse width modulation (PWM) scheme, wherein control signals are applied to the switches of the converter 13 in order to provide the desired conversion functionality. In one embodiment, the switches are controlled by employing a space vector pulse width modulation scheme.

The output of the converter 13 is connected to a DC link 14 which comprises a link capacitor for reducing the voltage ripple on the DC link.

The DC link 14 is connected to a grid side power converter 15. The topology of the grid side power converter 15 may be similar to the generator side power converter 13. The grid side power converter 15 for example normally operates as an inverter for converting the DC voltage on the DC link 14 into a regulated AC voltage for feeding active and reactive power to a power grid 18.

The output of the grid side power converter 15 may be filtered by means of inductors 16a, 16b, and 16c in order to, example, remove high order harmonics from the output power signal. The output power signal may, if needed, be filtered by a harmonic filter 17 in order to keep the interference or harmonic distortion at a low value. The output power signal is then provided to the power grid 18 via a transformer 19.

The system of generator side power converter (AC/DC converter) 13, DC link 14, and power grid side power converter (DC/AC converter) 15 can be seen as a converter module 20.

In one embodiment, the generator 11 is connected to the power grid 18 via a plurality of converter modules 20. The DC links 14 of the converter modules 20 may be interconnected which each other. This is illustrated in FIG. 3.

Figure 3:
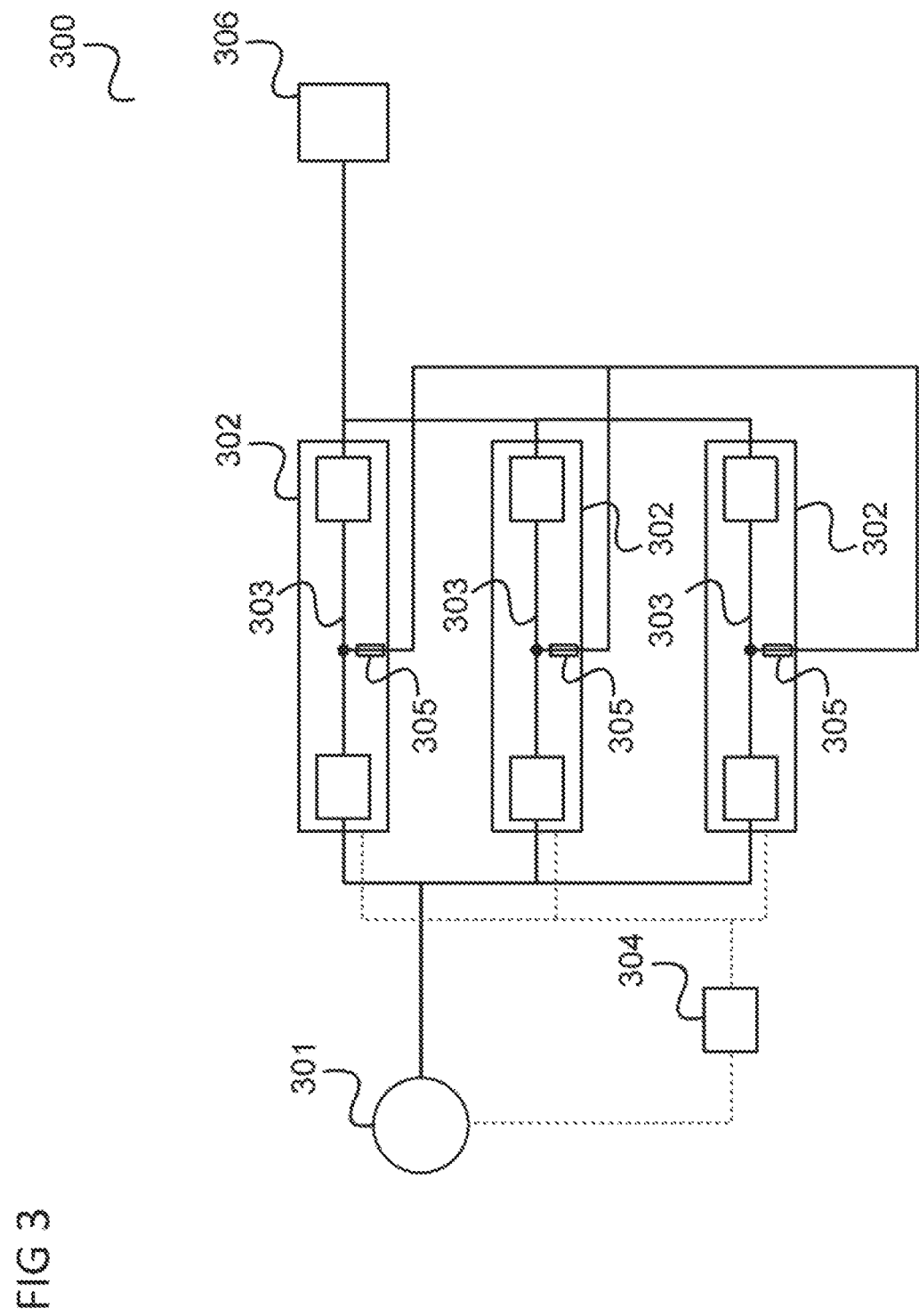
FIG. 3 shows a power generation system according to an embodiment.

FIG. 3 shows a power generation system 300 according to an embodiment.

The power generation system 300 comprises a power generator 301 and a plurality of converter modules 302, each converter module 302 having a DC link 303, wherein the DC link 303 of each converter module 302 is connected to the DC links 303 of the other converter modules of the plurality of converter modules 302 via a fuse 305 associated with the converter module 302.

The power generation system 300 further comprises a controller 304 configured to, if it is detected that there is a fault in one of the converter modules 302, disconnect the converter module 302 in which there is a fault from the power generator 301 and connect two or more other converter modules 302 of the plurality of converter modules 302 to the power generator 301 and to control the power generation system to supply power to the DC links 303 of the two or more other converter modules 302 such that power is supplied to the converter module 302 in which there is a fault via the fuse 305 associated with the converter module 302 such that the fuse associated with the converter module 302 melts.

In one embodiment, in other words, a faulty converter module is isolated by supplying power from two or more other (e.g. non-faulty, i.e. healthy) converter modules via the fuse of the faulty converter module such that the supplied power in other words the supplied current) melts the fuse. When the fuse has been melted the voltage of the DC links of the other (healthy) converter modules can be increased to normal DC operating values and the other (healthy) converter modules can be connected to a power grid 306 for normal power production. Thus, according to one embodiment, one or more faulty converter modules may be isolated and operation may be continued with the other healthy (i.e. operable) converter modules. It should be noted that the DC link of a converter modules may be connected via a plurality of fuses to the DC links of the other converter modules. In this case, one or all of the fuses may be melted.

When a fault is detected, in one embodiment, all the converter modules disconnected from the power grid and may also (at first) all be disconnected from the power generator. The two or more other converter modules may then be reconnected to the power generator in a pre-charge process (which is according to one embodiment also used to isolate the faulty converter module).

The fuse associated with the converter module may be part of the converter module.

The power generator is for example a permanent magnet generator.

According to one embodiment, the two or more other converter modules are converter modules for which no fault has been detected.

The power generation system may further comprise a detector configured to detect whether there is a fault in one of the converter modules of the plurality of converter modules.

According to one embodiment, each converter module has an input to receive power from the power generator and an output to provide power to a power grid 304, wherein the input is connected to the output via the DC link.

The power generation system may further comprise an AC/DC converter and a DC/AC converter wherein the AC/DC converter forms the input and the DC/AC converter forms the output.

The fault is for example caused by a fault in an IGBT (Insulated Gate Bipolar Transistor), generally of a switching element, e.g. a power semiconductor switching element, of the AC/DC converter or the DC/AC converter. This may lead to a short circuit of the DC link. For example, a top switching element of the AC/DC converter or the DC/AC converter cannot be turned off and then the bottom switching element is turned on which leads to a DC link shoot through. The fault may also be caused by an explosion of an IGBT module which leads to a fault to ground or a DC short. The converter module may also include a DC chopper circuit connected between the two conductors of the DC link and the fault may be caused by a DC chopper IGBT (or generally switching element) that cannot be turned off such that the DC link is shorted via the chopper resistor of the DC chopper.

According to one embodiment, the converter modules are configured to supply power to a power grid 304 and the controller is further configured to disconnect the plurality of converter modules from the power grid before controlling the power generation system to supply power to the DC links of the plurality of other converter modules such that power is supplied to the converter module in which there is a fault via the fuse associated with the converter module such that the fuse associated with the (faulted) converter module melts.

According to one embodiment, the controller is further configured to connect the two or more other converter module to connect to a power grid to supply power to the power grid after the fuse has been melted.

According to one embodiment, the controller is configured to control the power generation system to supply power to the DC links of the two or more other converter modules such that power is supplied to the converter module in which there is a fault via the fuse associated with the converter module such that the fuse associated with the converter module melts in course of a pre-charge procedure for pre-charging the converter modules. According to one embodiment, the controller controls the power generation system to supply power to the DC links of the two or more other converter modules such that power is supplied to the converter module in which there is a fault via the fuse associated with the converter module such that the fuse associated with the converter module melts by connecting the two or more other converter module to the power generator.

In the following, an embodiment is described in more detail with reference to FIG. 4.

Figure 4:
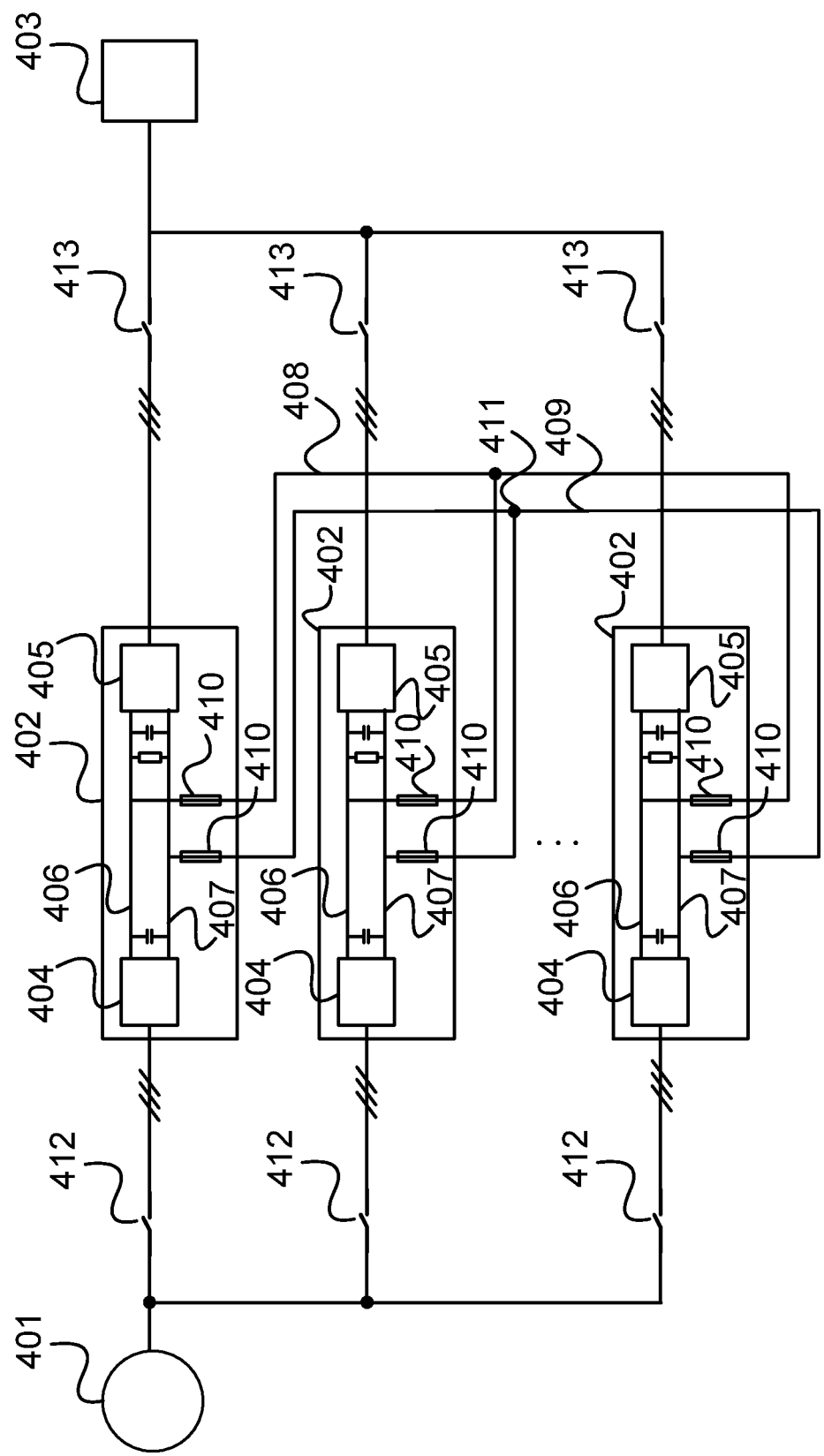
FIG. 4 shows a power generation system according to an embodiment.

FIG. 4 shows a power generation system 400 according to an embodiment.

Similarly to the power generation system 300, the power generation system 400 comprises a generator 401 and a plurality of converter modules 402 (e.g. four converter modules 402). The power generation system 400 further comprises a power grid 403.

Each converter modules 402 comprises an AC/DC converter 404 connected to the generator 401 and a DC/AC converter 405 connected to the power grid 403.

The AC/DC converter 404 and the DC/AC converter 405 of each converter module 402 are connected by means of a DC link which comprises a first conductor 406 and a second conductor 407 which are for example connected by one or more capacitors and/or one or more resistors, e.g. for filtering purposes.

The first conductors 406 of the converter modules 402 are connected to each other by a first interconnection 408 and the second conductors 407 of the converter modules 402 are connected to each other by a second interconnection 409.

Each converter module 402 comprises fuses 410 via which the first conductor 406 and the second conductor 407 are connected with the first interconnection 408 and the second interconnection 409. Or, in other words, the first interconnection 408 and the second interconnection 409 each comprise a fuse for each converter module 402. For example, a node 411 of the second interconnection 409 can be seen to be connected to the second conductor of each converter module 402 by means of the fuses 410. It should be noted that the fuses 410 do not necessarily have to be part of the converter modules 402 (e.g. do not have to be located in a housing together with the DC link of the converter module 402).

Each converter module 402 is connected to the power generator 401 by means of a respective first switch 412 and is con connected to the power grid 403 by a respective second switch 413.

An operation of the power generation system 400 for isolating a faulty converter module 402 is described in the following with reference to FIG. 5.

FIG. 5 shows a flow diagram according to an embodiment.

It is assumed that one of the converter modules 402 has a fault, in this example a short circuit in its DC link, i.e. a short circuit between its first DC link conductor 406 and second DC link conductor 407.

In 501, the fault is detected, e.g. by a fault detection circuit of the power generation system 400, e.g. arranged in the wind turbine comprising the generator 401.

In one embodiment, the isolation of the faulty converter module 402 is carried out in course of a pre-charging of the converter modules 402. For this, the converter modules 402 are, in 502, disconnected from the power grid 403 by means of the second switches 413.

In 503, the converter module 402 in which the fault has been detected is disconnected from the power generator 401, e.g. by means of the respective first switch 412. The other, faultless converter modules 402 (i.e., in other words, the operable converter modules 402 for which no fault has been detected) are connected to the power generator 401 by means of the first switches 412.

In 504, power supplied to the converter modules 402 by the power generator 401. Specifically, the DC links of the faultless converter modules 402 are powered. Thus, e.g. in case of a short circuit in the DC link of the faulty converter module, a high current will flow via the short circuit of the faulty converter module and a high current will thus flow over the fuses 410 of the faulty converter module which melts the fuses 410 (or at least one of the fuses of the faulty converter module) and thus isolates the DC link of the faulty converter module 402 from the DC links of the other, faultless converter modules 402.

In 505, the operable converter modules 402 may then be connected to the power grid 403 by means of the second switches 413.

As mentioned above, the faulty converter isolation method according to various embodiments, e.g. as described above with reference to FIG. 4, can be used in course of a converter pre-charge procedure. For example, a grid converter (as for example implemented by the converter modules 402) in a full scale wind turbine typically needs to pre-charged to avoid damaging the grid converter diodes during in-rush. In one embodiment, the generator 401 (e.g. a permanent magnet generator) is used to pre-charge the converter modules (eluding e.g. the AC/DC converters 404 and the DC/AC converters 405) instead of using an additional circuitry for the pre-charging.

According to one embodiment, before spin up of the wind turbine the generator breakers are closed and during spin up the permanent generator 401 charges up the converter modules and the grid breakers (i.e. the second switches 413) are only closed when the pre-charge procedure has been completed. This pre-charge method offers a high short circuit power, which can be used as described above to isolate faulty converter modules 402 in a converter system with inter connected DC links. As described above, in case the DC links are connected together with fuses (like shown in FIG. 4) and a converter module 402 shorts the DC link and reports an error, only the generator breakers (i.e. first switches 412) belonging to health (i.e. faultless) converter modules 402 are closed in the pre-charge method and current from the generator 401 can melt the fuse to the faulty converter module 402 and pre-charge and power generation can be continue with the healthy converter modules 402.

In case that pre-charge is carried out using an external circuit consisting of contactors, diode bridges, voltage transformers, fuses and wires the short circuit power may be rather low and if a converter module 402 is shorting the DC link the pre-charge circuit may not provide sufficient power to melt the fuse 410 of the faulty converter module 402. In this case, it may be necessary that a service team has to manually remove the fuse 410 or replace the converter module 402 before the turbine can be again put to operation. By using the generator 401 in the pre-charge method, extra pre-charge circuitry can be avoided, which simplifies the converter layout and reduces potential hardware failures and allows to isolate faulty converter modules 402 without manual intervene and the turbine can be continue to run using the healthy converter modules 402 until a scheduled visit can replace the faulty module or modules.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A power generation system comprising:
   a power generator;
   a plurality of converter modules, each individual converter module of the plurality of converter modules comprising a respective direct current (DC) link connected to DC links of other converter modules of the plurality of converter modules via a fuse associated with the individual converter module; and
   a controller coupled with the plurality of converter modules and configured to, upon detecting a fault in a first converter module of the plurality of converter modules:
   disconnect the first converter module from the power generator;
   connect, from an unconnected state, at least a second and a third converter module of the plurality of converter modules to the power generator; and
   control the power generation system to supply power to the DC links of the second and third converter modules such that power is supplied to the first converter module via the associated fuse such that the associated fuse melts.

2. The power generation system according to claim 1, wherein, for each converter module of the plurality of converter modules, the fuse associated with the converter module is part of the converter module.

3. The power generation system according to claim 1, wherein the power generator is a permanent magnet generator.

4. The power generation system according to claim 1, wherein the second and third converter modules are converter modules for which no fault has been detected by the controller.

5. The power generation system according to claim 1, further comprising a detector configured to detect whether a fault has occurred in any of the plurality of converter modules.

6. The power generation system according to claim 1, wherein each converter module comprises a respective input to receive power generated by the power generator and a respective output to provide power to a power grid, wherein the input is connected to the output via the respective DC link.

7. The power generation system according to claim 6, wherein each of the plurality of converter modules comprises a respective alternating current (AC)/DC converter and a respective DC/AC converter, wherein the AC/DC converter forms the input and the DC/AC converter forms the output.

8. The power generation system according to claim 1, wherein the detected fault in the first converter module is a short circuit of the DC link.

9. The power generation system according to claim 1, wherein the plurality of converter modules are configured to supply power generated by the power generator to a power grid, and wherein the controller is further configured to:
   disconnect the plurality of converter modules from the power grid before controlling the power generation system to supply power to the DC links of the second and third converter modules such that power is supplied to the first converter module via the associated fuse such that the associated fuse melts.

10. The power generation system according to claim 1, wherein the controller is further configured to:
    connect, upon determining the fuse of the first converter module has melted, the second and third converter modules to a power grid to supply power thereto.

11. The power generation system according to claim 1, wherein controlling the power generation system to supply power to the DC links of the second and third converter modules is performed as part of a pre-charge procedure of the controller for pre-charging the plurality of converter modules.

12. The power generation system according to claim 1, wherein controlling the power generation system to supply power to the DC links of the second and third converter modules is performed by the controller connecting the second and third converter modules to the power generator.

13. A method for operating a power generation system comprising a power generator and a plurality of converter modules, each individual converter module of the plurality of converter modules comprising a respective direct current (DC) link connected to DC links of other converter modules of the plurality of converter modules via a fuse associated with the individual converter module, the method comprising:
    upon detecting a fault in a first converter module of the plurality of converter modules:
    disconnecting the first converter module from the power generator;
    connecting, from an unconnected state, at least a second and a third converter module of the plurality of converter modules to the power generator; and
    supplying power to the DC links of the second and third converter modules such that power is supplied to the first converter module via the associated fuse such that the associated fuse melts.

14. The method of claim 13, wherein the plurality of converter modules are configured to supply power generated by the power generator to a power grid, the method further comprising:
disconnecting the plurality of converter modules from the power grid before supplying power to the DC links of the second and third converter modules.

15. The method of claim 13, further comprising:
beginning a predetermined procedure for pre-charging the plurality of converter modules,
wherein supplying power to the DC links of the second and third converter modules occurs during the procedure.

16. The method of claim 13, wherein the detected fault in the first converter module is a short circuit of the DC link of the first converter module.

17. The method of claim 13, further comprising:
connecting, upon determining the fuse of the first converter module has melted, the second and third converter modules to a power grid to supply power thereto.

18. A method of operating a power generation system comprising a plurality of converter modules, the plurality of converter modules corresponding to a plurality of interconnected direct current (DC) links, the method comprising:
upon detecting a faulty converter module of the plurality of converter modules:
disconnecting the faulty converter module from a power generator of the power generation system, the faulty converter module comprising a first DC link of the plurality of interconnected DC links;
connecting, from an unconnected state, at least a first non-faulty converter module of the plurality of converter modules to the power generator, the first non-faulty converter module comprising a second DC link of the plurality of interconnected DC links; and
supplying power via the second DC link to thereby disconnect the first DC link from the plurality of interconnected DC links.

19. The method of claim 18, wherein the plurality of interconnected DC links are connected via fuses associated with the plurality of converter modules, wherein disconnecting the first DC link comprises melting a fuse associated with the faulty converter module.

20. The method of claim 18, wherein the plurality of converter modules are configured to supply power generated by the power generator to a power grid, the method further comprising:
disconnecting the plurality of converter modules from the power grid before supplying power via the second DC link.

* * * * *